Figure 1:
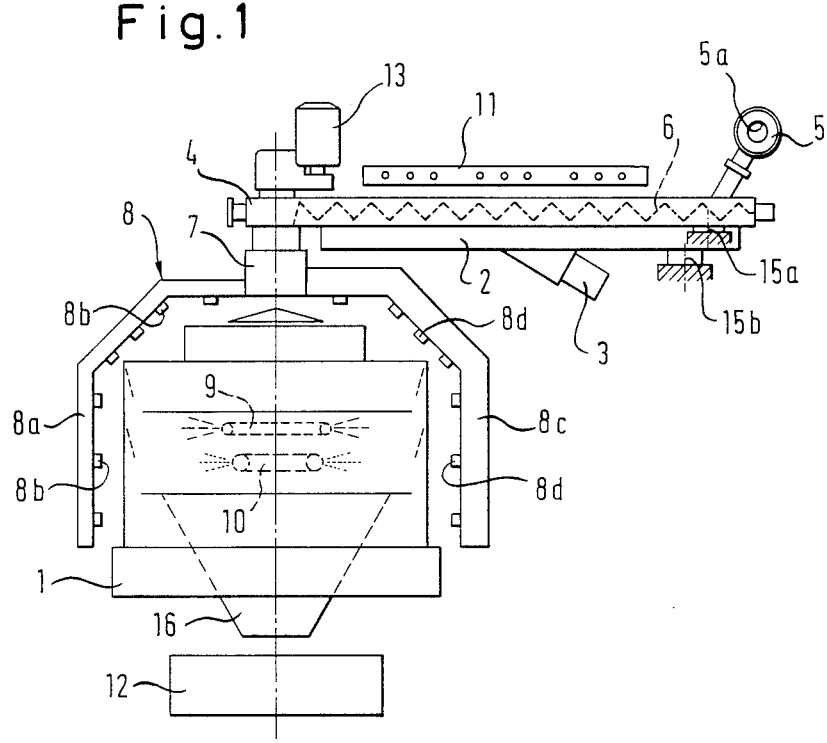

United States Patent [19]

Krämer

[11] Patent Number: 4,977,968
[45] Date of Patent: Dec. 18, 1990

[54] CLEANING DEVICE FOR WEIGHING MACHINES, IN PARTICULAR COMBINATION WEIGHING MACHINES

[76] Inventor: Wilhelm L. Krämer, Hans-Watzlikweg 10, 8264, Waldkraiburg, Fed. Rep. of Germany

[21] Appl. No.: 389,234

[22] Filed: Aug. 3, 1989

[30] Foreign Application Priority Data

Aug. 3, 1988 [DE] Fed. Rep. of Germany ....... 3826399

[51] Int. Cl.⁵ ...................... G01G 23/00; G01G 13/16
[52] U.S. Cl. ................................... 177/245; 177/25.18
[58] Field of Search ............................. 177/25.18, 245

[56] References Cited

U.S. PATENT DOCUMENTS

| 4,433,448 | 2/1984 | True . |
| 4,566,549 | 1/1986 | Oshima ................................ 177/245 |
| 4,821,820 | 4/1989 | Edwards et al. .................. 177/25.18 |

FOREIGN PATENT DOCUMENTS

| 0022879 | 1/1981 | European Pat. Off. . |
| 0114424 | 1/1984 | European Pat. Off. . |
| 192831 | 2/1983 | Japan . |
| 62-11117 | 6/1987 | Japan . |
| 2137969 | 10/1984 | United Kingdom . |

*Primary Examiner*—George H. Miller, Jr.

*Attorney, Agent, or Firm*—Sughrue, Mion, Zinn, Macpeak & Seas

[57] ABSTRACT

Cleaning, washing and drying device for weighing machines, in particular combination weighing machines, and weighing machine product feeding means and packaging machines.

The invention relates to a weighing machine which is monitored and controlled by a process control and with which a product feeding means to and/or a packaging machine can be arranged.

In the cleaning of such weighing machines, in particular combination weighing machines which comprise of a number of individual weighing machines arranged about a mostly circular hopper, the weighing machine must be extensively dismantled and then cleaned by hand, which is very time-consuming and work intensive. In the new weighing machine device the cleaning of the same is to be carried out with thoroughness and as little time consumption and work intensity as possible.

This aim is achieved in that a cleaning device is arranged by the weighing device for the cleaning thereof which is controlled with the aid of the process control of the weighing machine and which, if necessary, can be laid out for the simultaneous cleaning of the product feeding means and/or the packaging machine.

33 Claims, 3 Drawing Sheets

CLEANING DEVICE FOR WEIGHING MACHINES, IN PARTICULAR COMBINATION WEIGHING MACHINES

DESCRIPTION

The invention relates to a weighing machine, in particular a combination weighing machine, which is monitored and controlled by a process control and which can be arranged with a product feeding means, in particular a vibrator conveying trough, and/or a packaging machine.

Automatic weighing machines, in particular those which automatically supply packaging machines with the correct weight portions, are primarily used for the weighing of weight goods which sometimes leave residues behind on or in the weighing machine. After the weighing of food and semi-luxury food stuffs on such weighing machines, the deposited residues must be thoroughly removed. The careful cleaning requires that the weighing machines, specifically so-called combination weighing machines which comprise of a number of various weighing units arranged circularly or in similar form about a hopper, must be dismantled and then cleaned by hand, which is very time-consuming and involves much labour. Cleaning personel must always be held in stand-by ready to work, in particular after the ending of the regular daily production time.

It is therefore the object of the invention to provide a weighing machine arrangement in which the cleaning can be conducted with great care and with as little time-consumption and labor expenditure as possible.

This object is solved according to the invention in that a cleaning device is arranged by the weighing machine for the cleaning thereof, said cleaning device being controlled by means of the process control of the weighing machine and, if necessary, which can be laid out for the simultaneous cleaning of the product feeding means and/or the packaging machine.

The invention therefore relates to a cleaning, washing and drying device which allows for the automatic cleaning, by means of warm or cold water and enriched with cleaning agent, and the drying, by means of cold or warm and/or pressed air, of a weighing machine, for example a combination weighing machine, and/or a weigh product feeding means, in particular in the form of a vibrator conveying trough, as well as an attached packaging machine. Such a washing and drying device can be put into operation after the end of the regular daily production time or between the ending and re-starting of operation of the weighing machine for each different product to be weighed. The device automatically discontinues operation after the end of the washing and drying process. Consequently, for a considerable saving in personel, an effective and hygenic cleaning of the suitably equipped weighing machine can be achieved even for problematic goods.

The cleaning device is provided with a swinging arm on which a vertically standing hub is arranged for conveying cleaning fluid and drying air which rotates about its own axis. At least one rotating arm for applying cleaning fluid and/or drying air onto the weighting machine mounted on the hub. To achieve the optimum cleaning of the weighing machine, the rotating arm comprises a shape approximately corresponding to the external outline of the weighing machine. This serves the purpose that during operation of the cleaning device, the rotating arms describe a kind of envelope which corresponds to the outer contour of the weighing machine.

In accordance with the invention, the swinging arm is coupled with the rotatably mounted vibrator conveying trough such that during weighing, the vibrator conveying trough is always located centrally over the weighing machine, whereas during the washing and drying process, the swinging arm of the cleaning device is always swung centrically over the weighing device.

According to a further development of the invention, the rotating arm arranged on the swinging arm is automatically moved by sensors into a position parallel to the swinging arm for the out-of-operation setting. This measure has the purpose that during the swinging-away of the swinging arm after the setting out of operation of the cleaning device, the rotating arm does not collide with the weighing machine.

In accordance with the invention, the rotation arm has adjustable nozzles which are directed towards the weighing machine. Fluid such as warm or cold water, which is enriched with cleaning agent for example, is sprayed via one or more rotating arms through the adjustable nozzles onto the weighing machine. The nozzles can be adjusted in such as way that an optimal cleaning of the weighing machine is possible.

The hub arranged on the swinging arm is preferably driven by a gear motor. As the rotating arm is further fitted approximately to the external contour of the weighing machine with regard to its path and as a result of its rotation about the hub during the cleaning process, the rotating arm describes an envelope about the weighing machine through which, on account of the corresponding adjustment of the nozzles, the cleaning fluid or the drying air is applied with the same intensity on all areas of the weighing machine.

According to a further development of the inventive concept, at least one rotating arm of smaller cross section is mounted on the hub for the feeding of cleaning fluid. Furthermore, at least one rotating arm of larger cross section is additionally mounted on the hub to be used for the feeding of drying air.

In accordance with a further development of the invention, at least one ring nozzle is mounted inside the weighing machine for conveying the cleaning fluid and/or the drying air from the inside of the outside. Consequently, this area of the weighing machine to which access is gained only with great difficulty is effectively cleaned. Additionally in respect to this concept, at least one ring nozzle for the cleaning fluid and one ring nozzle for the drying air can be provided. Furthermore, the ring nozzle can be operated simultaneously during or after the carrying out of the washing process with the nozzles provided on the rotating arm.

The hub of the cleaning device arranged on the swinging arm is constructed such that cleaning fluid in one rotating arm and air in another rotating arm can be conveyed simultaneously. This means that as required, cleaning fluid and drying air can be simultaneously applied onto the weighing machine.

According to a further development of the device according to the invention, at least one tubular nozzle assembly for cleaning fluid and/or drying air and rotatable about a longitudinal axis can be mounted over the vibrator conveying trough for the cleaning thereof. Consequently, residue can be removed from this weigh product feeding means. The tubular nozzle assembly is preferably arranged to swivel about approximately 45 degrees so that a thorough cleaning of the vibrator conveying trough is guaranteed.

The nozzles arranged on the rotating arm, the ring nozzles and the tubular nozzle assembly are furthermore suited for the blowing through of compressed air. This means that after each washing process with water enriched with cleaning agents and before the drying process with cold or hot air, the wash pipe lines are blown free or water with compressed air so that during weighing a consequent dropping of water onto the goods to be weighed is avoided. Furthermore, before or during the introduction of the drying process, hot or cold air can been blown via the pipe lines blown free of water through the nozzles of the rotating arm, the ring nozzles and the tubular nozzle assembly to accelerate the drying process.

The swinging arm of the cleaning device consists of a tube of hollow cross section. A heater coil for heating the drying air is arranged in this tube. Furthermore, a fan is mounted at the inlet side of the swinging arm ahead of the heater coil. This fan serves the purpose of blowing warm dry air via the heater coil through the air nozzles of the rotating arm, the tubular nozzle assembly and the ring nozzles to dry the device.

The cleaning device can be equipped with a fluid pump automatically adjustable via the process control for dosing the wash-water with liquid cleaning agent. This is used so that washing processes of varying intensities for the various goods to be weighed can be achieved.

According to another further development of the inventive cleaning device, all of the store and weighing recepticals arranged on the weighing machine are regularly opened and closed during the cleaning process. A filling-up of the recepticals with wash-water is thereby avoided and an improved cleaning of these recepticals is simultaneously ensured.

It is of advantage that the process control includes several preprogrammed cleaning program. Wash and drying programs are stored in the process control such that each of the required running times of the individual washing program steps according to the level of dirtyness can be preset and that these stored washing programs of various intensity for various weigh products can then be called in.

According to another development of the inventive device, this is equipped with an additional automatically adjustable water pump which increases the normal water pressure of the supply means to the desired intensity.

According to a further development of the device according to the invention, where at least two weighing machines are arranged on a common platform, the cleaning device is movably arranged such that it can be conveyed in succession to the individual weighing machines for the cleaning thereof. This embodiment has the particular advantage that several combination weighing machines can be washed in succession with only one cleaning device to save costs and space.

The swinging arm can be mounted on a carriage displacable by hand or automatically on a platform railing or the platform base. The product feeding means of each weighing machine are drawn back so far during the cleaning process that the rotating arm is freely movable with respect to the product feeding means. Through this measure a collision of the rotating arm with the product feeding means is avoided during the cleaning process. To ensure the cleaning of the product feeding means of the weighing machines, according to another development of the inventive cleaning device, at least one tubular nozzle assembly for cleaning fluid and/or drying air and rotatable about a longitudinal axis is mounted over the drawn back product feeding means for the cleaning thereof. Furthermore, each respective tubular nozzle assembly is operationally connected with the rest of the cleaning device.

The cleaning of several weighing machines together with their product feeding means can be automated such that, for example, at the end of production a program can be set which is derived from emperical values comprising spraying time with cleaning fluid, pressure of the cleaning fluid and thus the cleaning fluid quantity, dosage of washing and desinfective agents in the heated washing water, forcing out time of the remaining water from the pipe system and drying time together with the adjustability of the drying air temperature. According to the level of dirtyness a desired number of cleaning programs with variable data for the washing process can be fed in. After the cleaning of the final weighing machine in this manner, the cleaning device discontinuous operation so that at the start of production work can be continued again with automatically cleaned and dried weighing machines.

Figure 2:
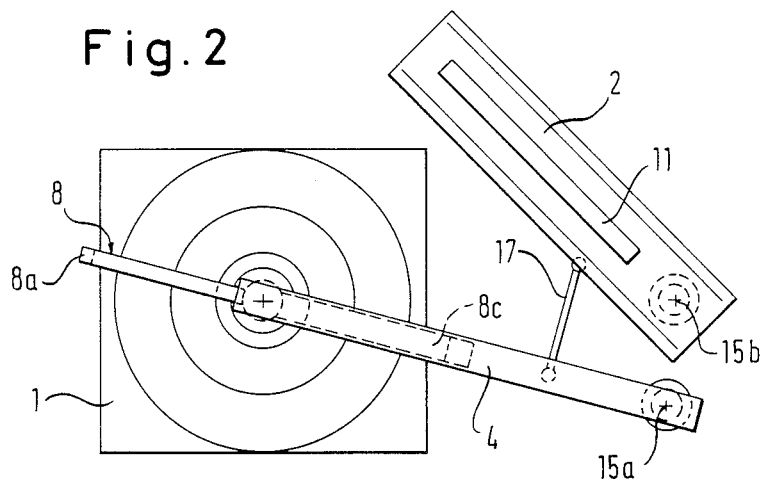
Figure 3:
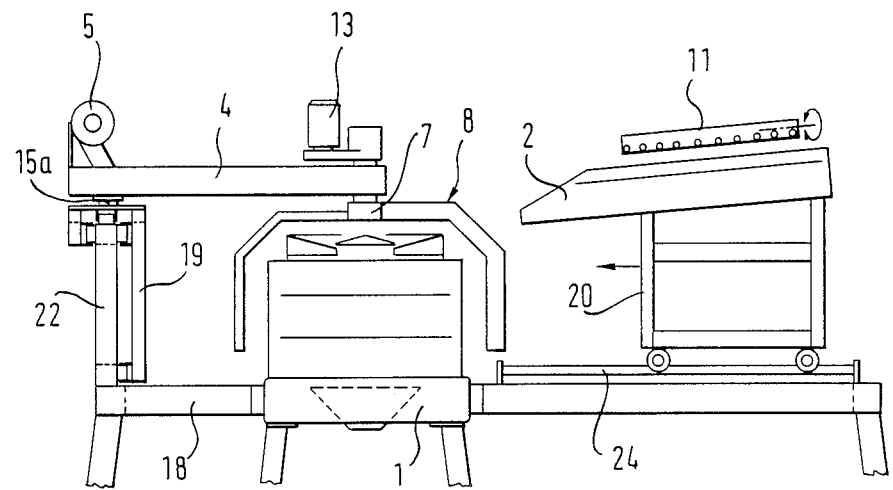

The subject matter of the invention is more closely described in accordance with the exemplified embodiments shown in the drawings as follows, in which FIG. 1 shows a schematic side view of a weighing machine and a cleaning device arranged therewith according to the invention, FIG. 2 shows a schematic plan view of an inventive weighing machine arranged with a cleaning device and a product feeding means, FIG. 3 shows a schematic side view of several weighing machines arranged one after the other with a movable cleaninhg device and a product feeding means, and FIG. 4 a schematic plan view of the arrangement according to FIG. 3.

In FIG. 1 an exemplified embodiment of a weighing machine 1 is shown with the inventive cleaning device. A product feeding means, for example a vibrator conveying trough 2, for the loading of the weighing machine 1 with goods to be weighed is provided with a vibrator drive 3. The vibrator conveyor trough 2 is swung over the weighing machine 1 about a center of rotation denoted with the reference numeral 15b.

A swinging arm 4 can be provided horizontally above the weighing machine 1 about a further point of rotation 15a. The swinging arm 4 consists of a tube of hollow cross section. At the inlet side of the swinging arm 4 a fan 5 to which an air intake 5a is arranged is mounted. The fan 5 serves to blow the air used for drying through the swinging arm 4 to the other parts of the cleaning device for conveying the air. A heater coil 6 is arranged within the swinging arm 4 for heating, if required, the air blown from the fan through the swinging arm.

A vertically standing hub 7 rotatable about its own axis is arranged on the swinging arm 4 and is constructed such that cleaning fluid and drying air/compressed air can be simultaneously conveyed through this. The hub 7 is preferably driven by a gear motor 13.

To apply cleaning fluid and/or drying air onto the weighing machine 1, rotating arms 8a and 8c are mounted on the hub 7. As FIG. 1 shows, a rotating arm 8a of smaller cross section for the conveyance of cleaning fluid as well as a rotating arm 8c of larger cross section for the conveyance of drying air are provided on the hub 7. Nozzles 8b and nozzles 8d are respectively applied to rotating arms 8a and 8c. The nozzles 8b and 8d can be adjusted as required so that the optimum guidance of the cleaning fluid or the drying air or compressed air takes place onto the weighing machine.

A gear motor 13 which rotates the hub 7 about a vertical axis is arranged on the swinging arm 4 above the hub 7. Furthermore, at the end of the swinging arm 4 at which the hub 7 is arranged, a washing and clear rinsing water and compression air intake is mounted via which the cleaning fluid and the compression air is conveyed through the hub 7 to the rotating arms 8a and 8c.

A ring nozzle 9 for washing and clear rinsing water and compressed air as well as a further ring nozzle 10 for drying air provided underneath the first ring nozzle 9 are mounted within the weighing machine 1. Via the ring nozzles 9 and 10, the cleaning fluid or drying air are sprayed or blown from inside the weighing machine 1 in the outward direction so that a cleaning of the weighing machine 1 from within also results.

To also ensure a cleaning of the vibrator conveying trough 2 already revealed, a tubular nozzle assembly 11 is arranged above the trough 2. The tubular nozzle assembly 11 is suited for the conveyance of washing and clear rinsing water, drying air and the blowing through of compressed air. It is arranged such that it swings about approximately 45 degrees in conforming with the shape of the vibrator conveying trough 2 to consequently optimise the cleaning of the trough. Beneath the weighing machine 1 as depected in FIG. 1, a packaging machine 12 is schematically shown. The cleaning of the packaging machine 12 ensues, for example, thereby that the washing or clear rinsing water sprayed on the weighing machine 1 and the vibrator conveying trough 2 flows through a discharge hopper 16 of the weighing machine 1 onto the packaging machine 12 and consequently causes a cleaning of the packaging machine 12. Naturally, an additional separate cleaning device within the scope of the present invention can be provided for the packaging machine 12.

FIG. 2 shows a plan view of the weighing machine 1 with the swinging arm 4 and the vibrator conveying trough 2 arranged therewith. The Figure shows the out-of-operation setting of the cleaning device whereby the swinging arm 4 is located centrically over the weighing machine 1. The rotating arm 8 arranged on the swinging arm 4 stands parallel to the swinging arm 4. The rotating arm 8 is automatically moved into this parallel position by sensors so that it does not collide with the weighing machine 1 during swinging of the cleaning device away from over the weighing machine 1. The vibrator conveying trough 2 and the swinging arm 4 are connected with one another by means of a coupling arm 17. The coupling arm 17 is used for the purpose that during pivoting of the swinging arm 4 or the vibrator conveying trough 2 about the points of rotation 15a or 15b, the respective equipment is positioned centrically over the weighing machine 1.

FIG. 3 shows a side view of one of several weighing machines 1 which are arranged one after the other on a common platform 18. The swinging arm 4 is mounted on a carriage 19 which is displacable by hand or automatically, for example by means of a motor, on a platform railing 22. Since each of these combination weighing machines 1 require a product feeding means, or rather a vibrator conveying trough 2, this is mounted in such a way on a carriage 20 such that it is movable towards and away from the weighing machine 1. During the cleaning process, the vibrator conveying trough 2 is drawn back so far that the rotating arm 8 arranged on the swinging arm 4 can freely move about the weighing machine 1 to clean this. Above the vibrator conveying trough 2, a tubular nozzle assembly 11 pivotable about approximately 45 degrees about its longitudinal axis is mounted for the cleaning and drying of the vibrator cpnveyor trough 2. During the cleaning process, the tubular nozzle assembly 11 is preferably automatically set into operation together with the rest of the cleaning device, although it can alternatively be operated and controlled separately from the washing device of the weighing machine 1 to clean the vibrator conveying trough 2.

Figure 4:
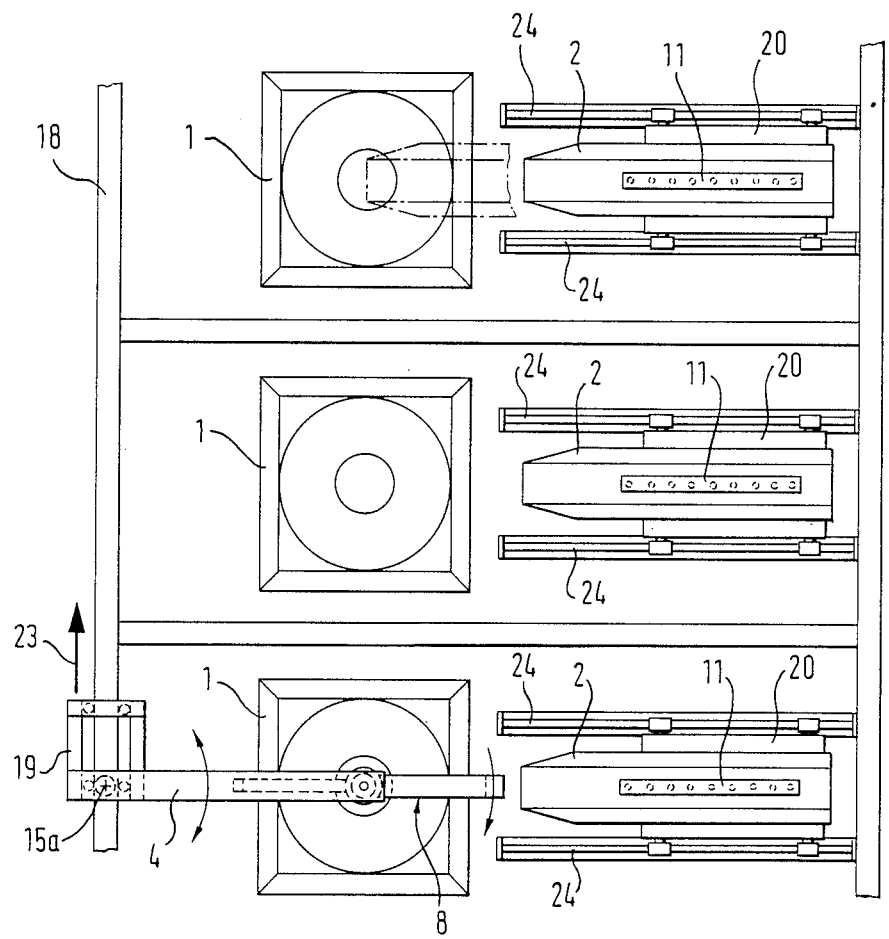

In FIG. 4 several weighing machines 1 arranged one after the other on a platform 18 and their respective vibrator conveying troughs 2 arranged to move towards and away from the conveying machine 1 are shown in plan view. The construction of the platform 18 and the arrangement of the weighing machines 1 on the platform is effected such that the carriage 19 supporting the swinging arm 4 can be moved from one weighing machine to the next in the direction of the arrow indicated at 23. The carriages 20 supporting the vibrator conveying troughs 2 are guided on rails 24 or similar means such that for the cleaning of a weighing machine 1, the respective carriage 20 can move away from and towards the weighing machine 1 to guarantee the free movement of the rotating arm 8 arranged on the swinging arm 4.

What is claimed is:

1. A cleaning device adapted for use with a weighing machine having a process control for monitoring and controlling the weighing machine while the weighing machine is not conducting weighing operation, the cleaning device comprising:
   means for activating the process control subsequent to normal weighing operations of said weighing machine;
   means for receiving cleaning signals from the process control; and
   means responsive to the cleaning signals for cleaning the weighing machine.

2. Cleaning device of claim 1, wherein the weighing machine includes store and weigh recepticles and wherein the process control of the weighing machine regularly opens and closes the store and weigh recepticles during the cleaning process.

3. Cleaning device of claim 1, wherein the process control includes several preprogrammed cleaning programs.

4. Cleaning device of claim 1, also adapted for simultaneously cleaning a packaging machine associated with the weighing machine.

5. Cleaning device of claim 1, also adapted for simultaneously cleaning a product feeding means associated with the weighing machine.

6. Cleaning device of claim 5, further comprising at least one tubular nozzle assembly for cleaning fluid rotatable about its longitudinal axis over the product feeding means for the cleaning thereof.

7. Cleaning device of claim 6, wherein the tubular nozzle assembly is arranged to swivel about approximately 45 degrees.

8. Cleaning device of claim 5, further comprising at least one tubular nozzle assembly for drying air rotatable about its longitudinal axis over the product feeding means for the drying thereof.

9. Cleaning device of claim 8, wherein the tubular nozzle assembly is suited for the blowing through of compressed air.

10. Cleaning device of claim 1, further comprising a swinging arm on which a vertically standing hub rotatable about its own axis is arranged, at least one rotation arm for applying cleaning fluid to the weighing machine being mounted on the hub, and wherein the swinging arm is horizontally pivotable such that the hub can be moved into a central position above the weighing machine.

11. Cleaning device of claim 10 wherein the hub is driven by a gear motor.

12. Cleaning device of claim 10, further comprising at least one rotating arm of larger cross section mounted on the hub for feeding drying air.

13. Cleaning device of claim 10, wherein the swinging arm is coupled with a pivotably arranged product feeding means such that either the swinging arm or the product feeding means can alternately be centered over the weighing device.

14. Cleaning device of claim 10, wherein the cleaning fluid comprises wash-water and liquid cleaning agent further comprising an adjustable fluid pump controlled by the process control for dosing the wash-water with liquid cleaning agent.

15. Cleaning device of claim 10, wherein the swinging arm of the cleaning device comprises a tube of hollow cross-section.

16. Cleaning device of claim 15, further comprising heater coil in the tube of the swinging arm and a fan for inducing flow through the tube.

17. Cleaning device of claim 10 wherein the rotating arm has a shape approximately corresponding with the external outline of the weighing machine.

18. Cleaning device of claim 17, wherein the rotating arm arranged on the swinging arm is automatically moved by sensors into a position parallel to the swinging arm for the out-of-operation setting.

19. Cleaning device of claim 17, wherein the rotating arm has adjustable nozzles directed towards the weighing machine.

20. Cleaning device of claim 19, wherein the nozzles arranged on the rotating arm are suited for the blowing through of compressed air.

21. Cleaning device of claim 1, further comprising a swinging arm on which a vertical standing hub rotatable about its own axis is arranged, at least one rotating arm for applying drying air to the weighing machine being mounted on the hub, and wherein the swinging arm is horizontally pivotable such that the hub can be moved into a central position above the weighing machine.

22. Cleaning device of claim 21, further comprising at least one rotating arm of smaller cross section mounted on the hub for feeding cleaning fluid.

23. Cleaning device of claim 22 wherein the hub of the cleaning device is formed such that cleaning fluid in one rotating arm and air in another rotating arm can simultaneously be conveyed.

24. Cleaning device of claim 10 adapted for use with a plurality of weighing machines arranged on a common platform, wherein the cleaning device is movably arranged such that it can be conveyed in succession to the individual weighing machines for the cleaning thereof.

25. Cleaning device of claim 24, wherein the swinging arm is mounted on a carriage displacable by hand or automatically on a platform railing or a base of the platform.

26. Cleaning device of claim 25, wherein at least some of the weighing machines include a product feeding means and wherein the product feeding means are drawn back so far during the cleaning process that the rotating arm is freely movable with respect to the product feeding means.

27. Cleaning device of claim 26, further comprising at least one tubular nozzle assembly for drying air rotatable about its longitudinal axis over the drawn back product feeding means for the drying thereof.

28. Cleaning device of claim 26, further comprising at least one tubular nozzle assembly for cleaning fluid rotatable about its longitudinal axis over the drawn back product feeding means for the cleaning thereof.

29. Cleaning device of claim 28 wherein the tubular nozzle assembly is connected with the rest of the cleaning device.

30. Cleaning device of claim 1, wherein at least one ring nozzle is mounted inside the weighing machine for conveying cleaning fluid from the inside to the outside.

31. Cleaning device of claim 1, wherein at least one ring nozzle is mounted inside the weighing machine for conveying drying air from the inside of the outside.

32. Cleaning device of claim 31, wherein the ring nozzles are suited for the blowing through of compressed air.

33. Cleaning device of claim 1, wherein the cleaning device has a water supply for the cleaning process further comprising a water pump which increases the normal water pressure of the water supply to a desired intensity.

* * * * *